United States Patent [19]

Kawashima et al.

[11] Patent Number: 4,940,447
[45] Date of Patent: Jul. 10, 1990

[54] AUTOTENSIONER FOR ADJUSTING THE TENSION OF A TIMING BELT

[75] Inventors: Kazuki Kawashima; Makoto Yasui; Hisashi Hayakawa; Masayuki Imoto, all of Iwata, Japan

[73] Assignee: NTN Toyo Bearing Co., Ltd., Osaka, Japan

[21] Appl. No.: 351,129

[22] Filed: May 12, 1989

[30] Foreign Application Priority Data

Apr. 27, 1989 [JP] Japan .................. 1-44715[U]

[51] Int. Cl.$^5$ .............................. F16H 7/08
[52] U.S. Cl. ......................... 474/110; 474/138
[58] Field of Search .............. 474/101, 109–111, 474/113–117, 133, 135, 136, 138

[56] References Cited

U.S. PATENT DOCUMENTS 4,790,796 12/1988 Okabe et al. .............. 474/138 X
4,798,563 1/1989 Okabe et al. .............. 474/111

Primary Examiner—Thuy M. Bui
Attorney, Agent, or Firm—Armstrong, Nikaido, Marmelstein, Kubovcik & Murray

[57] ABSTRACT

An autotensioner for adjusting the tension of a timing belt used with an automotive engine. It includes a cylinder case filled with a hydraulic oil, a piston partitioning the interior of the cylinder case into a pressure chamber and a reservoir chamber and a push rod having its bottom end coupled to the piston and the top end adapted to protrude from the cylinder case. A spring is provided to bias the piston and the push rod upwardly. The pressure chamber communicates with the reservoir chamber through a channel formed through the piston. A plate-shaped check valve is provided in the pressure chamber to open and close the bottom of the channel. The plate-shaped valve can respond quickly to the fluctuation of pressure in the pressure chamber because of its reduced mass. Thus, when the piston and the push rod rise biased by the spring, the valve can move quickly to such a position as to open the channel, thus allowing the hydraulic oil in the reservoir chamber to flow quickly and smoothly back into the pressure chamber. This will prevent cavitation in the pressure chamber. The responsiveness of the valve will be improved further by providing another spring for biassing the valve in such a direction as to open the channel.

3 Claims, 7 Drawing Sheets

FIG. 6A CHECK PLATE TYPE  3000 cSt  STROKE 0.17mm  AMBIENT TEMP. 11°C

FIG. 7A CHECK BALL TYPE  3000 cSt  STROKE 0.17mm  AMBIENT TEMP. 11°C

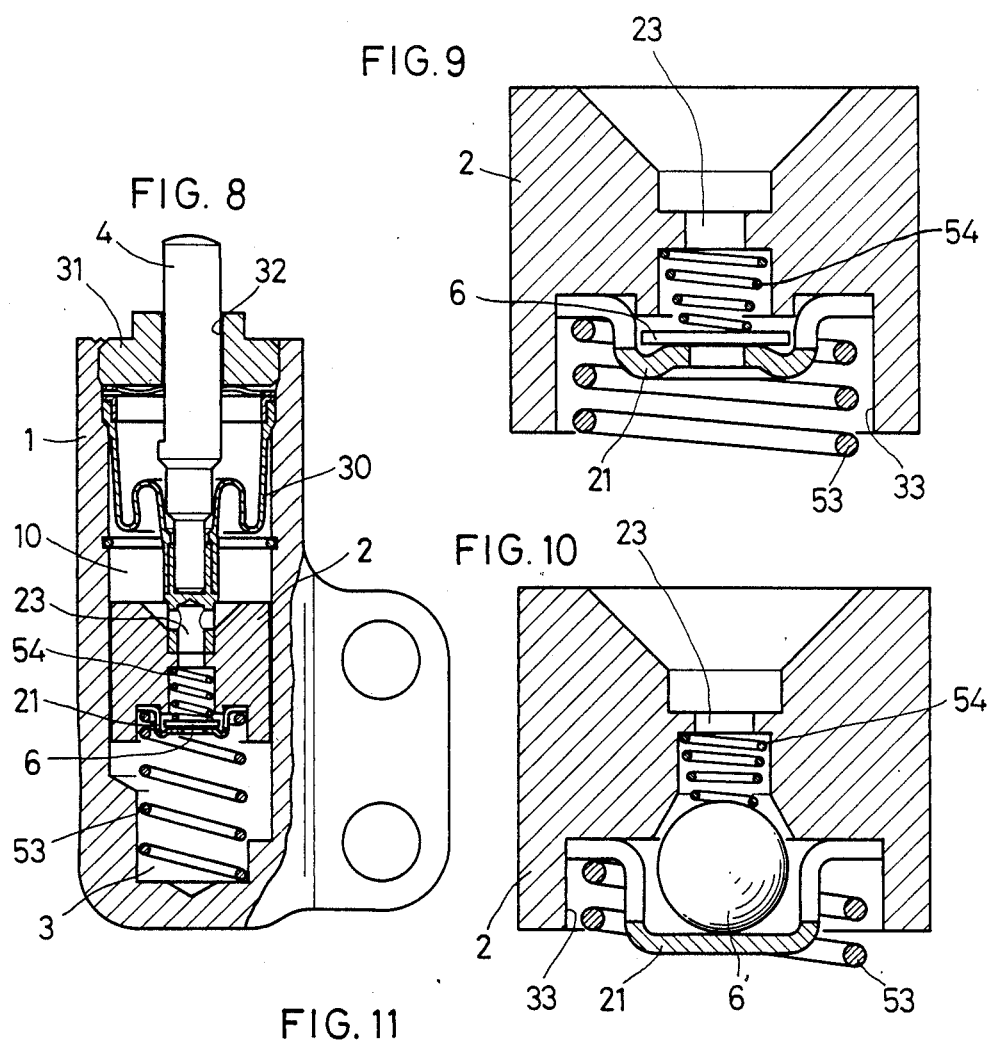

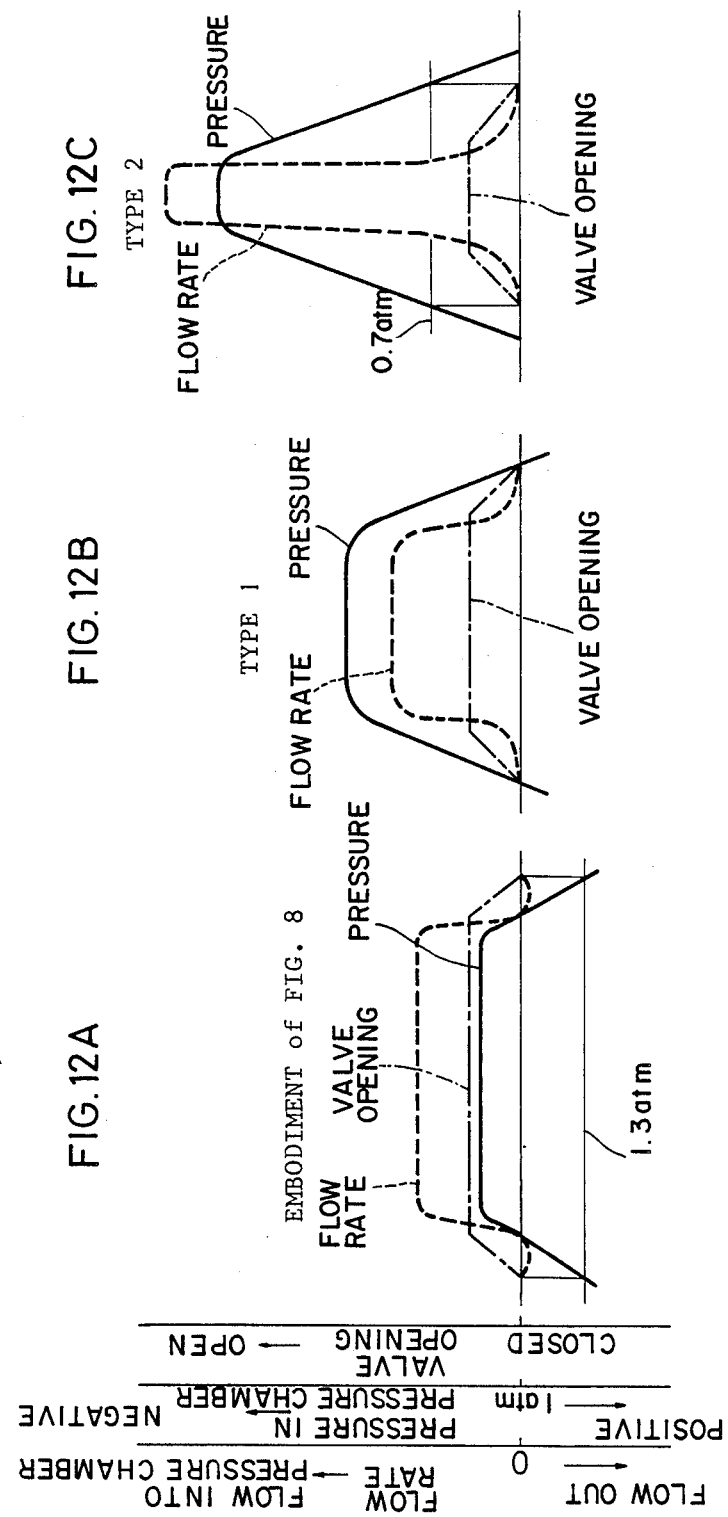

STATE 1 in FIG. 11

STATE 2 in FIG. 11

STATE 3 in FIG. 11

STATE 4 in FIG. 11

STATE 5 in FIG. 11

AUTOTENSIONER FOR ADJUSTING THE TENSION OF A TIMING BELT

The present invention relates to an autotensioner for adjusting the tension of a timing belt used with an automotive engine.

BACKGROUND OF THE INVENTION

An automotive engine uses a timing belt to drive its crankshaft, cam shafts and so on synchronously with one another. As shown in FIG. 18, a timing belt 64 is put around a crankshaft pulley 61, camshaft pulleys 62a and 62b and a drive shaft pulley 63 for an oil pump. Numerals 65 and 66 designate a tension pulley and an idler pulley, respectively. The tension pulley 65 is supported on a control arm 67 pivotally mounted on a pivot 68. An autotensioner 69 is provided in abutment with the control arm 70 to automatically adjust the pivotal motion of the tension pulley 65 and thus the tension of the timing belt 64.

This type of prior art autotensioner 69 has a cylinder case 70 filled with a hydraulic oil and a piston 71 slidably mounted in the case 70. A push rod 72 is fixed to the piston 71 so that its head will get into and out the case 70. The case has its interior separated into a pressure chamber 73 and a reservoir chamber 74 by the piston 71. A spring 75 is mounted in the pressure chamber 73 to bias the piston 71 upwardly. The spring 75 serves to bias the push rod 72 out of the case 70 while the engine is driven. The push rod 72 in turn pushes the tension pulley 65 through the control arm 67, thus preventing the timing belt 64 from loosening.

The push rod 72 is formed with a channel 76 extending from its bottom end face to side surfaces, whereas the piston 71 is formed with a channel 78 having its top open to the channel 76 and its bottom opening 77 communicating with the pressure chamber 73. A retainer 79 is secured to the bottom of the piston 71 facing the pressure chamber 73. A spring 80 has its one end secured to the retainer 79. A ball valve 81 is supported on the other end of the spring 80 and biassed by the spring 80 in such a direction as to close the opening 77, which is opened and closed as the oil pressure acting on the ball valve 81 fluctuates.

When such a force as to move the piston 71 toward the pressure chamber 73 acts on the piston while the engine is in operation, the ball valve 81 will move to close the opening 77. This will prevent any jerking movement of the piston 71 toward the pressure chamber 73, thus absorbing any fluctuation of tension of the timing belt 64 in operation. As a result, the crankshaft as well as the camshafts can be rotated in correct timing.

When the engine is stopped, some of the cams on the camshafts are in such a position as to keep their respective intake valves and exhaust valves pressed down. By the reaction force of the valve springs, the camshaft is turned in one direction until a dynamically stabilized point is reached. At this stabilized point, the timing belt will be loose at the portion between the camshaft pulleys 62a and 62b as shown for example by dotted line in FIG. 18. Instead, its tension will increase at the portion between the crankshaft pulley 61 and the camshaft pulley 62a. The increased tension of the timing belt 64 will be transmitted to the push rod 72 through a the tension pulley 65 to push it toward the pressure chamber 73. This will cause the hydraulic oil in the pressure chamber 73 to gradually flow into the reservoir chamber 74 through small gap formed around the outer periphery of the piston 71. The piston will thus gradually move toward the bottom of the case 70. In an extreme case, the piston 71 may actually hit the bottom and the timing belt will be left slack as shown by dotted lines in FIG. 18.

The timing belt tends to slacken conspicuously in a low-temperature condition because the volumes of the engine block and the cylinder head decrease. When the engine is started in such a condition, the slackness of the belt between the camshaft pulleys 62a and 62b will be removed instantly, but the belt will slacken between the crankshaft pulley 61 and the camshaft pulley 62a. The push rod 72 of the autotensioner 69 is expected to protrude and press through the control arm against the belt to remove the slackness of the belt between the crankshaft pulley 61 and the camshaft pulley 62a.

But when the engine is started in a low-temperature condition, a prior art autotensioner with the ball valve 81 may offer a problem that its push rod tends to protrude excessively to such an extent that the pressure chamber is put under negative pressure. Thus the damping action of the tension pulley 65 fails to keep constant the tension of the timing belt 64. This might cause the toothed timing belt and the pulleys to get out of meshing engagement with each other so that the belt might have its teeth damaged. This phenomenon takes place in a low-temperature atmosphere because the viscosity of the oil tends to increase sharply as the ambient temperature drops and a rather long time is required for highly viscous oil to flow from the reservoir chamber 74 into the pressure chamber 73.

Since the oil cannot flow into the pressure chamber 73 so quickly as to match the rising speed of the push rod 72 urged by the spring 75 in the pressure chamber 73, the pressure chamber will be put under negative pressure, causing cavitation. The damping action of the oil in the pressure chamber 73 will be lost completely by the cavitation. Thus, the tension pulley 65 will vibrate so violently under the fluctuating load from the timing belt 64 that the belt might have its teeth damaged).

The oil could flow through the channel, opening 77 more smoothly if the stroke of the ball valve 81 is increased. But the ball stroke has to be limited within 0.07–0.3 mm in order for the autotentioner to sufficiently dampen the fluctuating load from the timing belt 64. It is thus impossible to solve the problem by increasing the ball stroke.

It is an object of the present invention to provide an autotensioner which obviates the abovesaid shortcomings and which is free of cavitation and thus capable of driving a timing belt in a stable state.

SUMMARY OF THE INVENTION

In accordance with the present invention, there is provided an autotentioner for adjusting the tension of a timing belt, comprising a cylinder case, a piston slidably mounted in the cylinder case so as to partition the interior thereof into a pressure chamber and a reservoir chamber, the piston being formed with a channel for communicating the reservoir chamber with the pressure chamber, a push rod having one end thereof secured to the piston and the other end adapted to protrude out of the cylinder case, elastic means for biassing the piston and the push rod toward the reservoir chamber, a retainer mounted under the piston at the side of the pressure chamber, and a check plate held in the retainer so as to be movable between two positions to open and close the channel.

According to the present invention, a plate is used as the check valve instead of a ball.

The tension of the timing belt is transmitted to the push rod through the tension pulley and the control arm to move the push rod and the piston toward the pressure chamber against the bias of the elastic member. Thus the hydraulic oil in the pressure chamber will be compressed. This will move the check plate in such a direction as to close the bottom opening of the channel formed in the piston, preventing the push rod and the piston from moving any further. The pushing force from the timing belt is thus damped.

On the other hand, when the tension of the timing belt decreases, the piston and the push rod will be moved in the reverse direction by the elastic member so that the push rod will protrude from the cylinder case. By the movement of the piston away from the pressure chamber, its volume increases and thus its pressure drops. Because of the difference in oil pressure between the reservoir chamber and the pressure chamber, the check plate will be moved to open the channel in the piston, allowing the hydraulic oil in the reservoir chamber to smoothly flow back into the pressure chamber.

The stroke of the check plate is so short that it can respond quickly to any fluctuation of tension of the timing belt such as high-frequency fluctuation.

When the engine is started and the crank rotates in a low-temperature condition, the belt tends to get loose at the portion in contact with the tension pulley to remove the slackness of belt between the camshaft pulleys. Thus the pressure chamber will undergo a sharp drop in pressure. According to the present invention, the channel in the piston can be opened wide with a minimum stoke of the check plate. This will allow a large amount of hydraulic oil to smoothly flow through the channel into the pressure chamber without causing cavitation even if the pressure in the pressure chamber drops sharply.

Since the check plate makes a surface-to-surface contact with the piston and retainer, the piston and the retainer scarcely wear. Thus the stroke of the check plate will change little even after long years of use in contrast with a prior art ball check valve.

Other features and objects of the present invention will become apparent from the following description taken with reference to the accompanying drawings, in which:

BRIEF DESCRIPTION OF THE DRAWINGS

FIGS. 6A-6B and 7A-7B are graphs showing the test results for the first embodiment and a prior art one, respectively, when the engine is started in a low-temperature condition;

FIG. 8 is a sectional view of the fourth embodiment of the present invention;

FIG. 9 is an enlarged sectional view of a check valve of the same;

FIG. 10 is an enlarged sectional view of another type of check valve;

FIG. 11 is a graph showing the fluctuation of pressure in the pressure chamber in one revolution of the crankshaft of a four-cylinder engine;

FIGS. 12A to 12C are graphs each showing the relationship among the flow rate of the hydraulic oil, the degree of opening of the valve body and the pressure in the pressure chamber when the pressure chamber is under negative pressure, for the fourth embodiment, Type I and Type II autotensioners, respectively;

DESCRIPTION OF PREFERRED EMBODIMENTS

Figure 1:
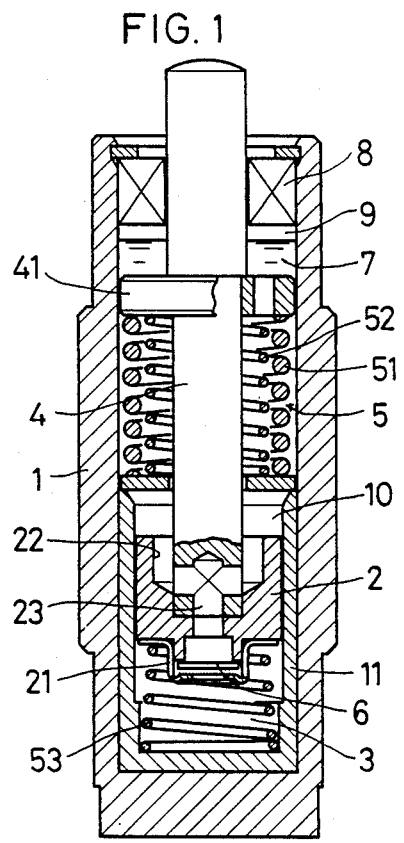
FIG. 1 is a sectional view of the first embodiment of the present invention.

As shown in FIG. 1, the first embodiment according to the present invention comprises a cylinder case 1, a piston 2 partitioning the interior of the cylinder case 1 into a pressure chamber 3 and a reservoir chamber 10, a push rod 4 having its one end secured to the piston 2 and the other end adapted to protrude out of the cylinder case, a pressure control elastic member 5 for adjusting the pushing force of the push rod 4, a retainer 21 mounted to the end face of the piston 2 facing the pressure chamber 3, and a check plate 6 supported on the retainer 21. The cylinder case 1 is filled with a hydraulic oil 7.

A cylinder 11 is mounted in the cylinder case 1 at its lower half portion. The piston 2 is adapted to slide along the inner wall of the cylinder 11. The push rod 4 has its bottom end received in a hole formed in the top of the piston 2. An annular channel 22 is formed in the piston 2 and oil return channels 23 are formed in the push rod 4 and the piston 2. A guide flange 41 is provided around the push rod 4 at its intermediate portion to prevent the push rod 4 from inclining when pushed obliquely by a control arm supporting a tension pulley pressed against a timing belt (which are not shown in the drawings).

The pressure control elastic member 5 comprises pressure control springs 51 and 52 which are mounted around the push rod 4 between the top of the cylinder 11 and the guide flange 41, and another pressure control spring 53 provided in the pressure chamber 3. The spring 53 serves to push up the retainer 21 press-fitted in the bottom of the piston 2 so that the retainer will not come off the piston. The spring 53 also serves to urge the piston 2 upwardly so that the push rod 4 will be movable in unison with the piston 2 with its bottom end received in the hole formed in the top surface of the piston 2. Its bias adds to the upward bias of the pressure control springs 51 and 52 on the push rod 4.

In this embodiment, the hydraulic oil 7 is silicone oil. An oil seal 8 is provided over the guide flange 41 to seal the hydraulic oil. Between the oil seal 8 and the top surface of the hydraulic oil 7, a small air gap 9 is left to allow for expansion of the hydraulic oil resulting from temperature rise.

Figure 2:
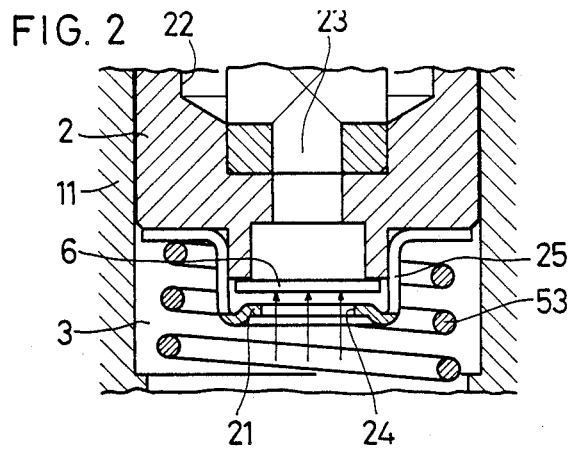
FIG. 2 is an enlarged view of the retainer and the check plate of the same.

Next referring to FIG. 2, the upright portion of the retainer 21 serves to stop the lateral movement of the check plate 6. The retainer 21 is formed in its bottom with a round hole 24 and in its upright portion with four slits 25. The round hole and the slits serve as oil channels and allow the check plate 6 to move quickly. By the provision of the oil channels, the check plate 6 is prevented from inclining in spite of the fact that the retainer has a rather flat surface.

The check plate 6 is made by punching a cold-rolled plate. Its hardness should be 40-55 HRC (Rockwall C hardness) in view of the wear resistance and toughness.

Now the operation of the first embodiment will be described. When a force resulting from the fluctuation of the belt tension is applied to the protruding end of the push rod 4 through the control arm supporting the tension pulley, it will act to compress the hydraulic oil in the pressure chamber 3 through the piston 2. The oil will flow upwardly through the round hole 24 in the retainer 21 as shown by arrows in FIG. 2, thus pushing up the check plate 6 against the piston 2 to close the opening at the bottom of the piston.

Within this short period of time during which the check plate 6 moves up to close the opening, the push rod 4 moves down a short distance, dampening the force from the tension pulley.

When the force from the tension pulley disappears or decreases, the pressure control elastic member 5 will now push up the piston 2 and the push rod 4 so that the push rod will protrude from the cylinder case 1 to press the tension pulley against the timing belt, thus stretching the belt taut.

Figure 3:
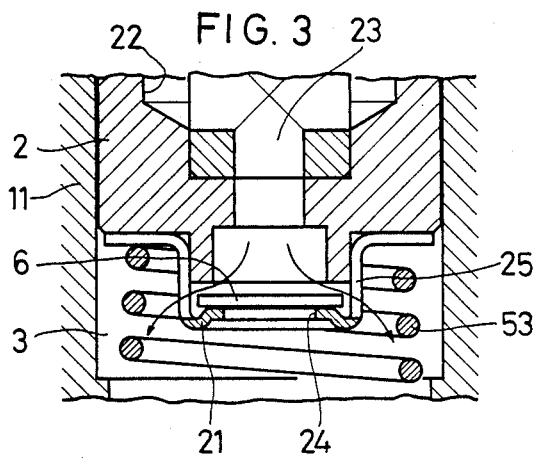
FIG. 3 is a view similar to FIG. 2 showing how they operate.

When the piston 2 moves upwardly, as shown in FIG. 3, the oil in the reservoir chamber 10 will flow through the annular channel 22 and the oil return channel 23, press down the check plate 6 to open the bottom of the channel 23 and flow back into the pressure chamber 3 through the four slits 25 formed in the upright portion of the retainer 21. The advantage of the check plate 6 is that it can open or close the channel with such a short stroke that the oil in the reservoir chamber 10 can flow quickly and smoothly back into the pressure chamber 3.

When an engine provided with the autotensioner according to the present invention is started in a low-temperature condition, the timing belt will get loose at the portion in engagement with the tension pulley owing to the rotation of the crankshaft. The push rod 4 will protrude to remove the slackness of the belt. The pressure in the pressure chamber 3 will drop sharply. But no cavitation will occur because the check plate 6 can respond quickly to the change of pressure. Thus the tension of the timing belt can be adjustd to an optimum level without the fear of the belt teeth getting broken.

In order to see how the autotensioner having the check plate in this embodiment is effective in preventing cavitation compared with an autotensioner with a conventional check ball, the following tests were conducted.

Both autotensioners were filled with a viscosity of 5000 cSt (at about −30° C.) of oil. The piston of each autotensioner was pushed down by 10 mm by hand and the hand was released. The piston rised 10 mm back to its original position by the bias of the spring. Cavitation was observed in the pressure chambers in both autotensioners. We checked how long it took until the cavitation disappeared. The results are as follows:

Autotensioner with check ball
... 180–200 sec.
Autotensioner with check plate
... 2.5–3 sec.

The results show that the check plate is far more responsive than the check ball, though the values depend on the size and stroke of the ball or plate.

Figure 6B:
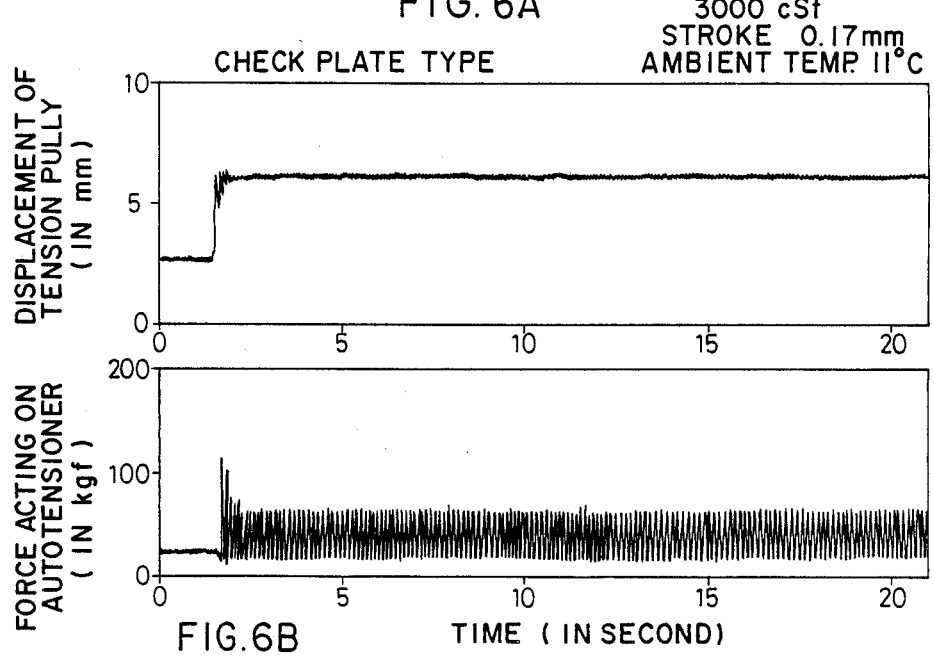
Figure 7B:
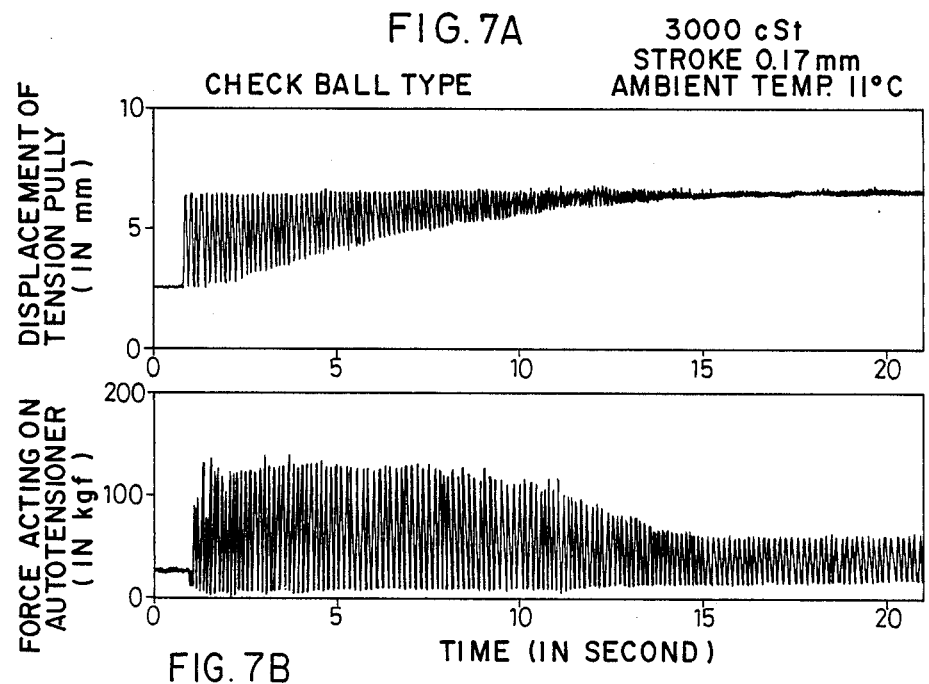
Figure 13A:
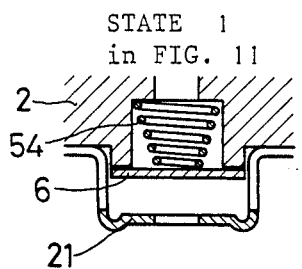
FIGS. 13A to 13E are sectional views of the valve of the fourth embodiment showing how the flow of hydraulic oil and the opening of the valve change.
Figure 13B:
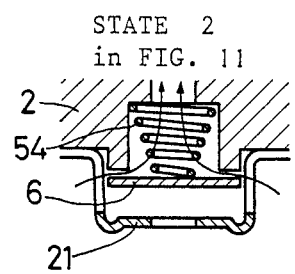
Figure 13C:
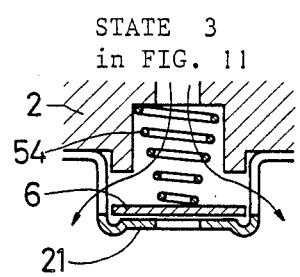
Figure 13D:
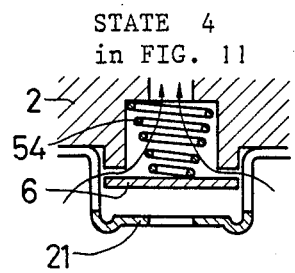
Figure 13E:
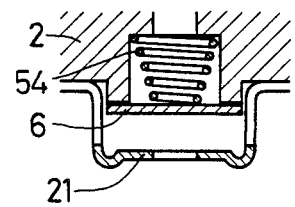

In order to further check the performance of the autotensioner of this embodiment and a conventional one, we measured the displacement of the tension pulley and the fluctuation of force which acts on the autotensioners immediately after the engine has started in a low-temperature condition. The results are shown in FIGS. 6 and 7. FIG. 6 shows the results with the check plate according to the present invention and FIG. 7 shows the results with the conventional check ball type. Since this test was conducted in an ambient temperature of 11° C. which is not necessarily considered a low-temperature condition, we used a hydraulic oil having a high viscosty (3000 cSt) to create the same condition as a low-temperature condition.

The results of the test show that the check plate type autotensioner gains stable state in one second after the engine has started, whereas the check ball type one requires 10 or more seconds until its gains stability. This means that the check plate type one is far superior in the operating characteristics immediately after the engine has started.

Figure 4:
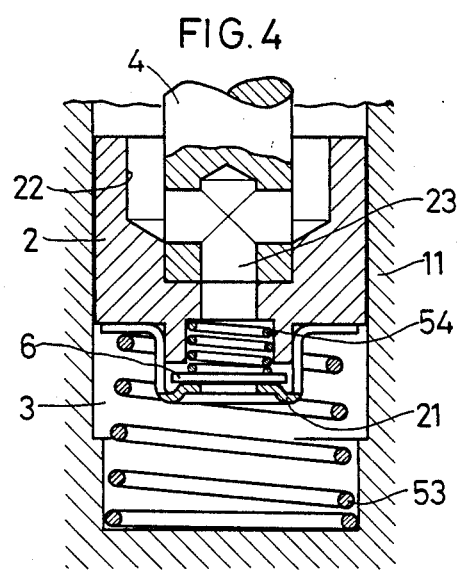
FIGS. 4 and 5 are sectional views of the second and third embodiments, respectively.

FIG. 4 shows the second embodiment in which a spring 54 having a small elasticity is provided to bias the check plate 6 downwardly. The spring 54 serves to further improve the responsiveness of the check plate 6 to the fluctuation of load from the timing belt.

Figure 5:
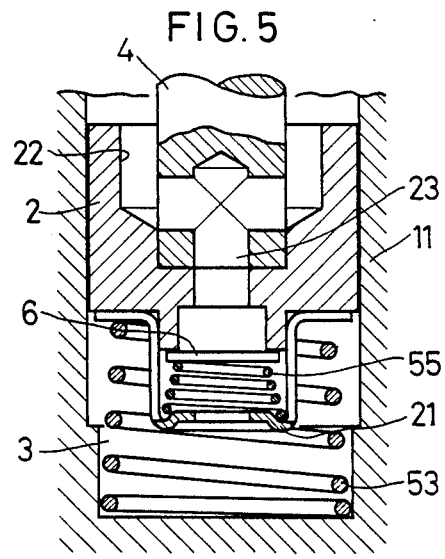

FIG. 5 shows the third embodiment in which a spring 55 is provided under the check plate 6 to push it upwardly. The object of the spring 55 is to hold the check plate.

The check valve structure having the check plate 6 is applicable to a conventional autotensioner.

FIG. 8 shows the fourth embodiment having a cylinder case 1 formed with a pressure chamber 3 and a reservoir chamber 10.

A hydraulic oil is sealed in both of the chambers. A piston 2 is slidably mounted in the case 1 to separate the chambers 3 and 10 from each other and is formed with a channel 23 communicating the pressure chamber 3 with the reservoir chamber 10.

A diaphragm 30 is provided to prevent the leakage of the hydraulic oil in the reservoir chamber 10. A push rod 4 is provided in the reservoir chamber 10 with its one end connected to the piston 2 and the other end protruding out of the case 1 through a hole 32 formed in a rod cover 31 closing an open end of the case 1.

In the pressure chamber 3 is mounted a pressure control spring 53 biassing the piston 2 and the retainer 21 toward the reservoir chamber 10.

As shown in FIG. 9, the retainer 21 supports the check plate 6 and a spring 54. The retainer 21 is press-fitted in a recess 33 formed in the bottom face of the piston 2. The pressure control spring 53 is held in abutment with the retainer 21.

The spring 54 serves to bias the check plate 6 in such a direction as to open the channel 23. It may be a coil spring but should preferably be a tapered spring as shown in the drawings so as not to hinder the flow of hydraulic oil.

The valve body should preferably be in the form of a plate because it is smaller in mass and thus more responsive than a ball-shaped one having the same pressure-receiving area. But, it may be in the form of a ball 6' as in FIG. 10.

This autotensioner has its case 1 fixedly mounted on a stationary member and its push rod 4 in abutment with a roller arm supporting a tension roller to press the tension roller against a cam driving belt.

When the push rod 4 is subjected to a force to push it into the case 1, the piston 2 will move toward the pressure chamber 3. This causes part of the hydraulic oil in the pressure chamber 3 to flow into the reservoir chamber 10 through a minute gap formed between the outer surface of the piston 2 and the case 1. When the push rod 4 is relieved of such a pushing force, the piston 2 will move toward the reservoir chamber 10 by the bias of the spring 53. The tension of the driving belt is thus kept uniform.

It is known that the load on an autotensioner reaches its peak twice every revolution of an engine if it is a fourcylinder engine and three times per revolution for a sixcylinder engine. The peak value varies within the range of 30-100 kg, depending on the layout of the engine.

FIG. 11 shows how the pressure in the pressure chamber 3 per revolution of a four-cylinder engine fluctuates. If the pressure falls too far below the atmospheric pressure, cavitation tends to take place in the pressure chamber 3.

The pressure in the pressure chamber 3 is prevented from dropping too far below the atmospheric pressure because the valve body 6 is adapted to be pushed by the spring 54 in such a direction as to open the channel 23. This will effectively restrain the occurrence of cavitation.

Let us now compare the function of the fourth embodiment, Type I and Type II autotensioners. The Type I has no spring 54 and the Type II has a spring arranged to bias the valve body 6 in such a direction as not to open but to close the passage 23.

The pressure Pi in the pressure chamber 3 when the passage 23 is opened by the valve body 6 is expressed by the following formulas if the inertia of the valve body 6 is ignored:

$Pi < Po + F/S$ for the fourth embodiment
$Pi < Po$ for the Type I
$Pi < Po - F/S$ for the Type II wherein Po is the pressure in the reservoir chamber 10 (atmospheric pressure), F is the bias of the spring 54 and S is the effective area of the valve body 6.

Suppose that the pressure applied to the valve body 6 by the spring 54 (which is expressed by F/S) is 0.3 atm (atmospheric pressure). Then the valve body 6 will be moved to open the passage 23 when the pressure Pi has fallen below 1.3 atm with the fourth embodiment and below 0.7 atm with the Type II. With the Type I, the passage 23 will open when the pressure Pi has fallen below the atmospheric pressure.

The hydraulic oil in the reservoir chamber 10 begins to flow into the pressure chamber 3 only after the pressure Pi has fallen below Po. Thus, with the Type I, the hydraulic oil will begin to flow as soon as the passage 23 is opened by the valve body 6, whereas with the Type II, it will not begin to flow until Pi gets lower than $0.7 \times Po$.

In contrast, with the fourth embodiment, when Pi reaches the atmospheric pressure, the passage 23 has already been open, thus allowing the hydraulic oil in the reservoir chamber 10 to smoothly flow into the pressure chamber 3.

In terms of the Pi value where the hydraulic oil in the reservoir chamber 10 begins to flow into the pressure chamber 3, the relationship among the three autotensioners is expressed by the following inequality:

Embodiment VI > Type I > Type II

This means that the fourth embodiment is the least likely to develop cavitation in the pressure chamber 3 among three.

FIG. 12 shows the relationship among the flow rate of the hydraulic oil, the degree of opening of the valve body 6 and the pressure in the pressure chamber 3, for the three autotensioners.

FIGS. 13A to 13E show the positions of the value body and the change of flow rate of hydraulic oil at the points 1 to 5 shown on the fluctuation curve in FIG. 11.

With the fourth embodiment, a small amount of hydraulic oil may flow into the reservoir chamber 10 when the pressure in the pressure chamber 3 is 1-1.3 atm. But the time during which Pi is whithin the range of 1-1.3 atm will be negligibly short if the peak pressure in the pressure chamber 3 is 50 atm. Further, in this state, the pressure difference between the pressure chamber 3 and the reservoir chamber 10 as well as the degree of opening of the valve body are so small that only a limited amount of hydraulic oil will flow into the reservoir chamber 10. The valve body 6 is adapted to be held wide open when the hydraulic oil flows into the pressure chamber 3, thus allowing a smooth flow of oil. This compensates for the abovesaid minor shortcoming. Thus, the pressure in the pressure chamber 3 will be kept from falling excessively below the atmospheric pressure.

Figure 14:
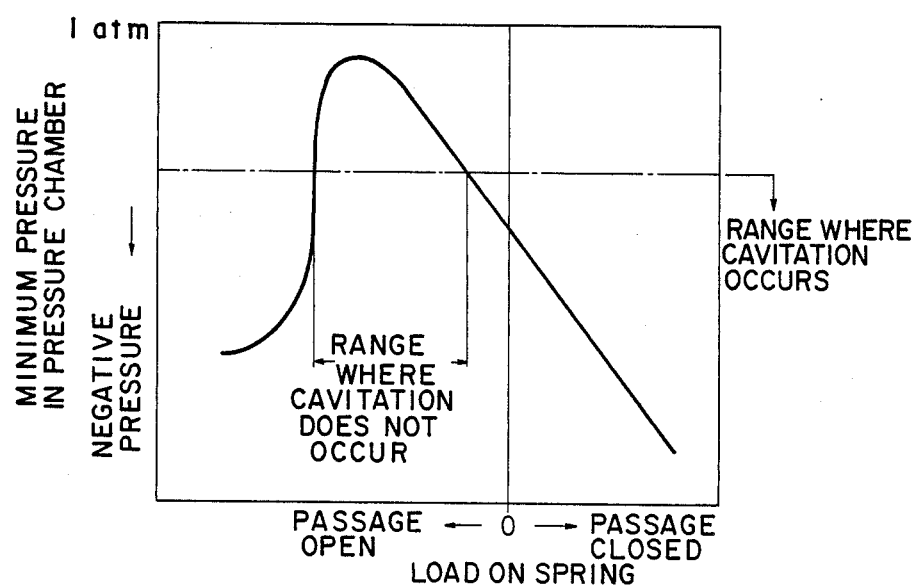
FIG. 14 is a graph showing the relationship between the bias of the spring and the minimum pressure in the pressure chamber.

But as shown in FIG. 14, if the bias of the spring 54 is larger than a given point, the amount of hydraulic oil flowing into the reservoir chamber 10 will get so large as to kill the advantage of keeping the valve body 6 wide open while the hydraulic oil is flowing into the pressure chamber 3. As a result, the negative pressure in the pressure chamber 3 will increase.

As will be apparent from FIG. 14, in order to prevent the cavitation in the pressure chamber 3, the spring 54 has to be mounted to push the valve body 6 in such a direction as to open the passage 23 and its bias has to be within the range shown.

Figure 15:
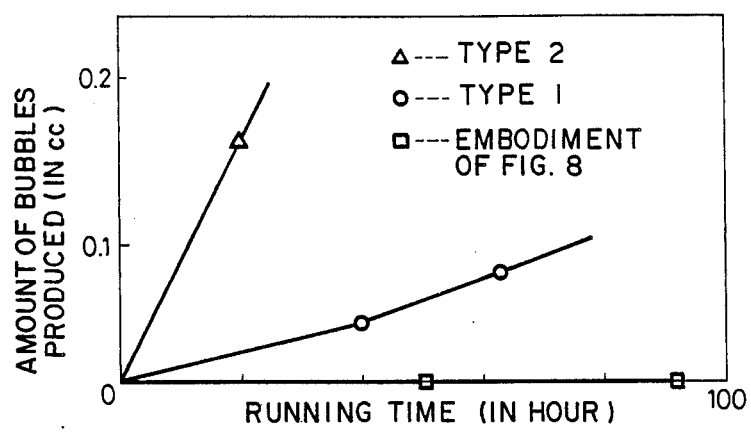
FIG. 15 is a graph showing the volumes of bubbles produced in the pressure chambers of the fourth embodiment, Type I and Type II autotensioners, respectively.

FIG. 15 shows the volume of bubbles formed in the pressure chamber when an automotive engine was continuously operated at 6000 rpm with each of the three embodiments mounted thereon. No bubbles were observed with the fourth embodiment.

Figure 16:
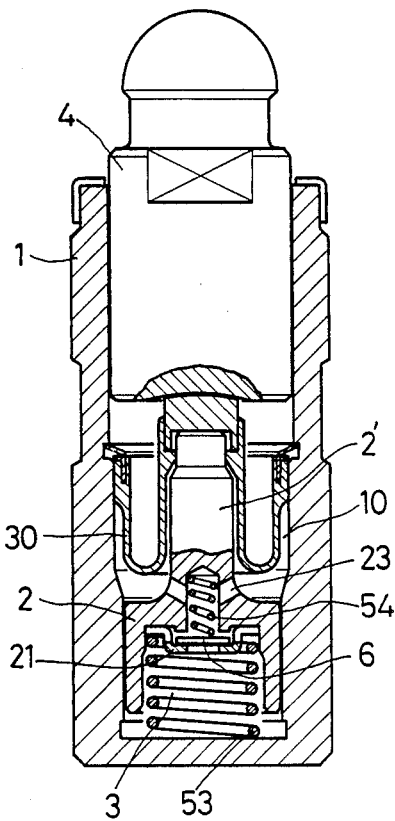
FIG. 16 is a sectional view of the fifth embodiment according to the present invention.

The present invention is not limited to an autotensioner but may be a hydraulic lash adjustor as shown in FIG. 16. The latter may be either oil-sealed type or an oil-replenishing type.

The hydraulic lash adjustor of FIG. 16 comprises a case 1 formed with a pressure chamber 3 and a reservoir chamber 10, a piston 2 slidaby mounted in the case to separate the chamber 3 and 10 from each other, a rod 2' provided on the piston 2 and a push rod 4 slidaby mounted in the case 1 and having its one end connected to the rod 2'.

Figure 17:
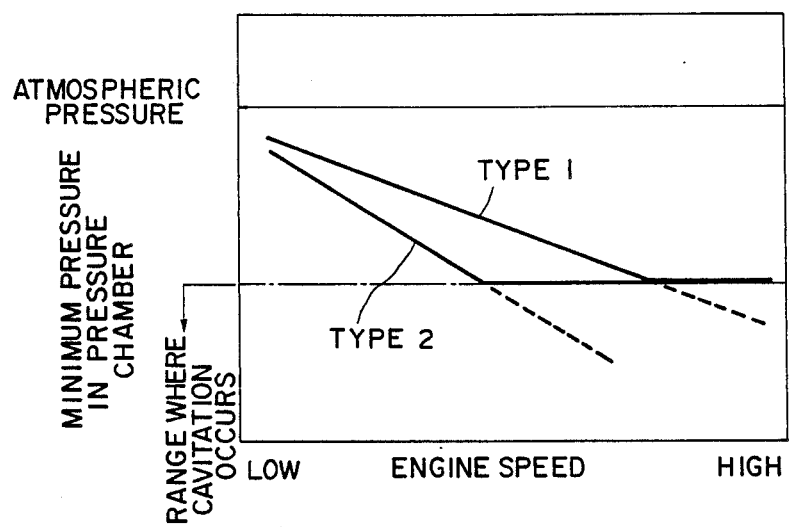
FIG. 17 is a graph showing the relationship between the engine speed and the minimum pressure in the pressure chamber.
Figure 18:
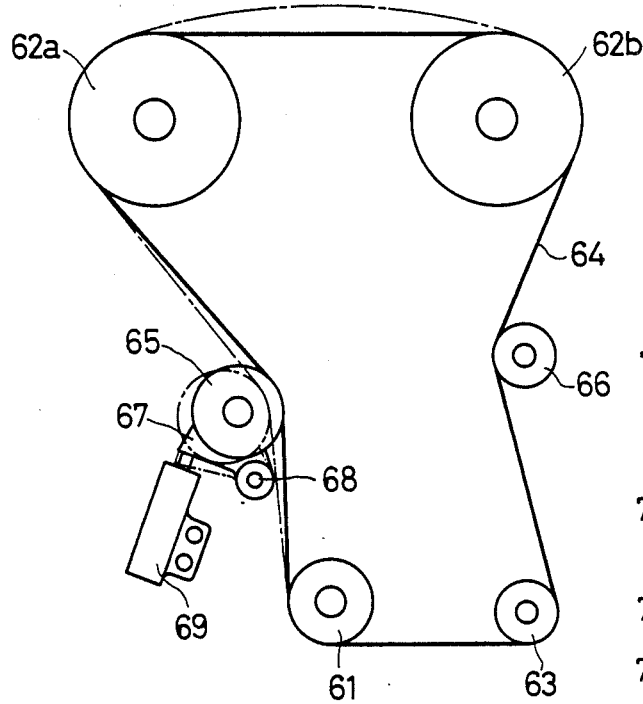
FIG. 18 is a schematic view showing how a timing belt is used.
Figure 19:
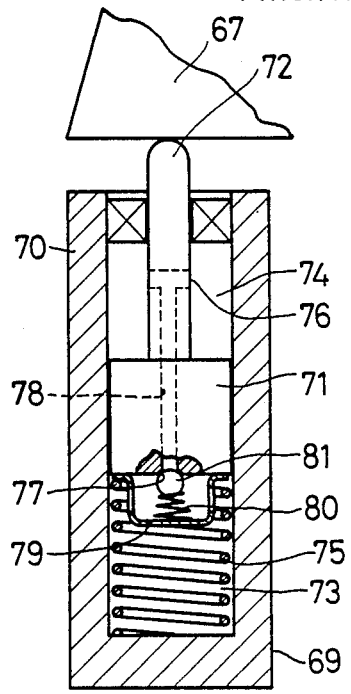
FIG. 19 is a sectional view of a prior art autotensioner.

FIG. 17 shows the relationship between the engine speed and the minimum pressure in the pressure chamber 3 if the amplitude of the load acting on the hydraulic autotensioner is assumed to be constant. As will be seen from FIG. 17, the Type 2 develops cavitation in the pressure chamber at a lower engine speed than Type 1.

A check valve is mounted in the pressure chamber 3 to open and close a passage 23 formed in the piston 2. The check valve comprises a valve body 6 and a spring 54 biasing the valve body in such a direction as to open the passage 23.

A hydraulic lash adjustor is used in a valve operating system to get rid of valve clearances. According to the present invention, the valve body 6 is pushed by the spring 54 in such a direction as to open the passage 23. This will prevent the occurrence of cavitation in the pressure chamber 3 when the engine is driven at a high speed.

What is claimed is:

1. An autotensioner for adjusting the tension of a timing belt, comprising a cylinder case, a piston slidably mounted in said cylinder case so as to partition the interior thereof into a pressure chamber and a reservoir chamber, said piston being formed with a channel for communicating said reservoir chamber with said pressure chamber, a push rod having one end thereof secured to said piston and the other end adapted to protrude out of said cylinder case, elastic means for biassing said piston and said push rod toward said reservoir chamber, a retainer mounted under said piston at the side of said pressure chamber, and a check plate held in said retainer so as to be movable between two positions to open and close said channel.

2. An autotensioner as claimed in claim 1, further comprising another elastic means for biasing said check plate in such a direction as to open said channel.

3. An autotensioner as claimed in claim 1, further comprising another elastic means for biasing said check plate in such a direction as to close said channel.

* * * * *